United States Patent
Brown et al.

(10) Patent No.: US 8,243,984 B1
(45) Date of Patent: Aug. 14, 2012

(54) USER IDENTIFIABLE WATERMARKING

(75) Inventors: Robert K. Brown, Edina, MN (US);
Neal B. De Pape, Minnetonka, MN (US); Jason D. Reasoner, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 483 days.

(21) Appl. No.: 12/615,788

(22) Filed: Nov. 10, 2009

(51) Int. Cl.
*G06K 9/00* (2006.01)
*H04N 7/18* (2006.01)

(52) U.S. Cl. ......................... 382/100; 382/291; 348/143

(58) Field of Classification Search .................. 382/100, 382/103, 106–107, 155, 162, 168, 173, 181, 382/199, 219, 224, 232, 254, 274, 276, 291, 382/305, 312; 386/224; 709/231; 348/143, 348/150, 231.99; 725/136
See application file for complete search history.

(56) References Cited

U.S. PATENT DOCUMENTS

| | | | |
|---|---|---|---|
| 5,587,833 A | 12/1996 | Kamentsky | |
| 6,075,560 A * | 6/2000 | Katz | 348/150 |
| 6,144,797 A * | 11/2000 | MacCormack et al. | 386/224 |
| 6,490,681 B1 | 12/2002 | Kobayashi et al. | |
| 6,750,919 B1 | 6/2004 | Rosser | |
| 6,839,403 B1 | 1/2005 | Kotowski et al. | |
| 7,150,400 B2 | 12/2006 | Melick et al. | |
| 7,206,409 B2 | 4/2007 | Antonellis et al. | |
| 7,337,971 B2 | 3/2008 | Melick et al. | |
| 7,460,148 B1 * | 12/2008 | Clark et al. | 348/143 |
| 7,698,450 B2 * | 4/2010 | Monroe et al. | 709/231 |
| 2004/0024709 A1 | 2/2004 | Yu et al. | |
| 2004/0068758 A1 * | 4/2004 | Daily et al. | 725/136 |
| 2004/0135902 A1 * | 7/2004 | Steensma | 348/231.99 |
| 2006/0262280 A1 | 11/2006 | Duffield et al. | |

OTHER PUBLICATIONS

"Visual DV Time Stamp (vDTS)", DV/Photo Time Stamp, 2004, [Online], Jul. 6, 2009. Retrieved from http://dts8888.com/vDTS/vdts.htm.
"The multi-channel video capture solution that continues to evolve, even after installation", Videum 4400 AV Xpress, May 2009, [Online], Retrieved Jul. 6, 2009, Retrieved from http://www.winnov.eom/downloads/datasheets/Videum_4400_AV_Xpress_Datasheet.pdf.

* cited by examiner

*Primary Examiner* — Seyed Azarian
(74) *Attorney, Agent, or Firm* — Theodore M. Magee; Westman, Champlin & Kelly, P.A.

(57) ABSTRACT

In one embodiment, video from a security camera is overlaid with small but visible indicators in each corner of the frame. The indicators may comprise an encoded value that can be decoded upon visual inspection by a user without the use of a computer. The encoded value may identify the camera such that a user knowledgeable about the format and sequence of the indicators can view the images and readily understand the identity of the security camera. In some embodiments, the indicators identify other information associated with the video such as the persons, objects, locations, conditions, times, or other data that is associated with the video.

21 Claims, 7 Drawing Sheets

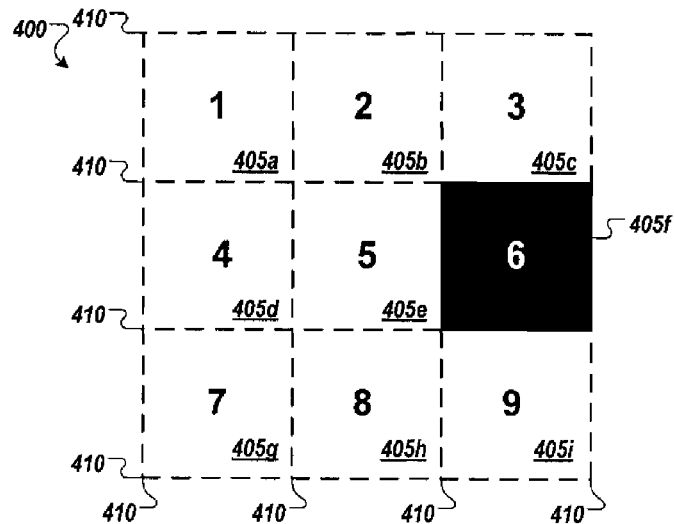
FIG. 4A
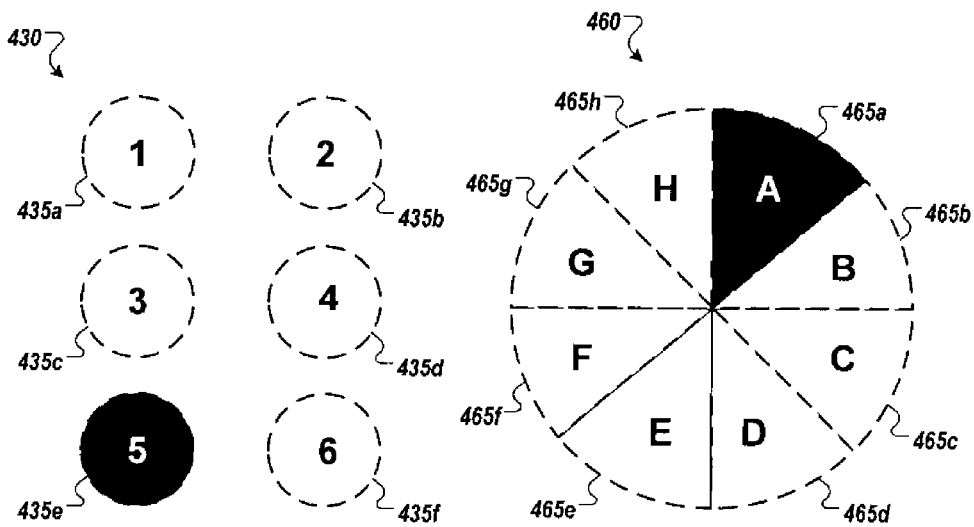
FIG. 4B
FIG. 4C

USER IDENTIFIABLE WATERMARKING

BACKGROUND

Video systems are commonly used to monitor various commercial or retail locations such as stores, warehouses, athletic facilities, etc. In particular, video systems may be used to monitor different locations within the interiors of such facilities, including high traffic aisles, security sensitive areas, and the like. Such systems may also be used to monitor locations at the exteriors of facilities, such as parking lots, loading docks, external doors, etc.

Depending on the particular type of facility or the location of the facility being monitored, the reasons for video monitoring may be different. For example, video monitoring in a jewelry store may be used primarily for store security, and may help to prevent theft or to identify perpetrators and recover merchandise after a theft has occurred. In a different facility less focused on security and theft prevention, such as an athletic facility, video monitoring may be used primarily for safety purposes or to monitor for overflow capacity of a particular area.

Videos and images can be stored for later retrieval and viewing. For example, surveillance video can be archived in a device that is able to retain and protect the video for an extended period of time from things such as tampering, fire, flood, or vandalism. Archive systems can also protect videos and images from loss due to equipment failure or loss. Such systems may provide backup services, or may employ redundant internal systems to protect against loss due to the failure of one or more subsystems.

Archived videos and images can be selectively retrieved for analysis. For example, video taken of a roadway intersection may be retrieved to view captured footage of an automobile collision for purposes of reconstructing the accident long after the accident has happened. In some implementations, archived videos and images can also be used in legal proceedings. For example, surveillance video of a convenience store checkout may be used as evidence to help prosecute an accused thief by providing evidence that the accused perpetrator was at the premises at the time in question.

SUMMARY

In one embodiment, video from a security camera is overlaid with small but visible indicators in each corner of the frame. The indicators may comprise an encoded value that can be decoded upon visual inspection by a user without the use of a computer. The encoded value may identify the camera such that a user knowledgeable about the format and sequence of the indicators can view the images and readily understand the identity of the security camera. In some embodiments, the indicators identify other information associated with the video such as the persons, objects, locations, conditions, times, or other data that is associated with the video.

In another embodiment, an indicator includes an array of subregions wherein each subregion represents one of a collection of values and is visually distinguishable from the other subregions. The subregions are arranged such that a user can determine the location of the visually distinguished subregion within the indicium, and thereby visually decode the value associated with the subregion and the indicium. In one embodiment, the indicium is a matrix of nine subregions wherein each subregion represents a value of one through nine, and by making one of the subregions visibly distinct from the others, the indicium conveys a value of one through nine.

In another embodiment, multiple subregions of an indicator are made visually distinguishable from the others so the indicium is able to convey an expanded range of values. In one embodiment, an indicator having six subregions, wherein each subregion is optionally distinguishable, can represent $2^6$ possible values. The number of possible values in this embodiment can be increased further by increasing the number of visually distinguishable states. For example, each of the six subregions can be displayed in one of four colors, expanding the range of possible values represented by the indicium to $4^6$, or 4096 possible values.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

FIG. 4A illustrates an example matrix template used to form user identifiable watermarks.

FIG. 4B illustrates another example matrix template used to form user identifiable watermarks.

FIG. 4C illustrates an alternative geometry of a template to form user identifiable watermarks.

Like reference symbols in the various drawings indicate like elements.

DETAILED DESCRIPTION OF ILLUSTRATIVE EMBODIMENTS

Information such as the identity of the camera used to capture an image, or the date and time when the image was captured, are useful for determining the origin of the captured image. Other optional types of identifying information include the identity of a person or persons related to the captured image. For example, images of a retail checkout lane optionally include the identity of the cashier on duty, or images captured by police car video optionally include the identity of the officer behind the wheel, or images of a casino card table optionally include the identity of the dealer at the table.

The captured images are imprinted with one or more watermarks that represent the identifying information, wherein the watermarks are partial opacity indicators (e.g., indicia) that are both humanly visible and decodable. By providing humanly visible watermarks, rather than by hiding the data within the image (e.g., through stenography), the information carried by the watermarks is able to better survive copying, re-encoding, enlargement, reduction, and other such modifications to the image. For example, a digital image or video that includes visible watermarks, when converted to an analog format (e.g., printed, copied to DVD), will still retain watermarks that are decodable to retrieve the identifying information they represent.

By providing humanly decodable watermarks, the information represented by the watermarks may be at least partially decoded and comprehended without the need for additional devices or equipment (e.g., computers, bar code scanners, 2D matrix scanners). For example, a person can observe a watermark and, based on the watermark's location within the image or the location of visible elements within an expected region, can decode a value represented by the watermark. In embodiments where the value does not have an immediate meaning to the viewer, the value is used to determine a meaning from another information source (e.g., a database, a catalog, a list).

Figure 1:
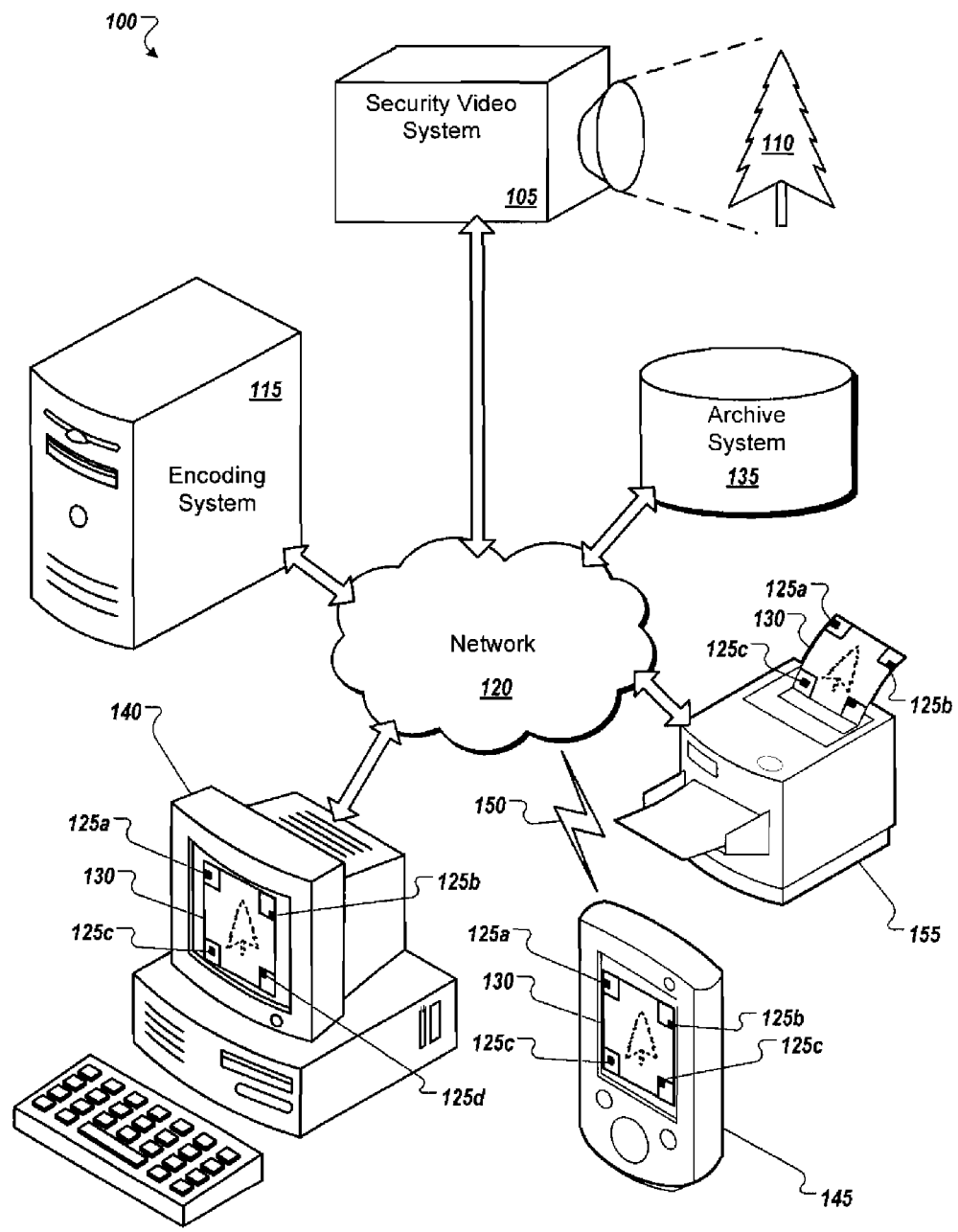
FIG. 1 is a conceptual diagram of a representative system for adding user identifiable watermarks to captured images.

FIG. 1 is a conceptual diagram of a representative system 100 for adding user identifiable watermarks to captured digital images. The system 100 includes a security video system 105. The security video system 105 is part of a collection of one or more image capture devices and computer-based processors (e.g., digital cameras, digital video recorders, video digitizers) for capturing and digitizing images of a scene 110 as electronic image data files. The security video system 105 is associated with an identifier that is used to uniquely identify the security video system 105 from other image capture devices. For example, the video security system 105 can be given the identity "4951".

The security video system 105 transmits the captured image to an encoding system 115 over a communications network 120 (e.g., a local area network, a cellular network, the Internet). The encoding system 115 is a computer-based system that modifies (e.g., watermarks) the captured images such that an indicium 125a, an indicium 125b, an indicium 125c, and an indicium 125d are visible along with an image of the scene 110 when the modified image 130 is displayed. Example processes for adding watermarks to captured images are discussed in connection with FIGS. 2 and 5.

The encoding system 115 determines one or more identifiers to be associated with the captured image, and determines one or more indicia to represent the identifiers. Each of the indicia 125a-125d symbolizes a value that represents an identifier or part of an identifier that is associated with the captured image. For example, the modified image 130 was captured by the security video system 105 which is designated as "4951", and the encoding system 115 determines to use the indicium 125a to represent the number "4", the indicium 125b to represent the number "9", the indicium 125c to represent the number "5", and the indicium 125d to represent the number "1". Various indicia for representing values are discussed in connection with FIGS. 3, 4A, 4B, and 4C.

The encoding system 115 transmits the modified image 130 to an archive system 135. The archive system 135 is a server computer that includes a collection of storage devices (e.g., hard drives, optical drives, tape drives, a RAID array) that securely stores images, backs them up, and subsequently retrieves and serves the images to display devices when requested. The archive system 135 allows only authorized users to retrieve stored images by comparing a requesting user's identity with an access control list to restrict the distribution of stored images to only authorized users and/or authorized display devices. The archive system 135 optionally includes a web server that provides access to stored images through a web browser.

A computer 140 and a handheld device 145 (e.g., cell phone, PDA) request and display the modified image 130 to one or more users. The computer 140 sends a request over the network 120 to the archive system 135 to retrieve the modified image 130 stored therein. The handheld device 145 communicates with the network 120 over a wireless communications link 150 (e.g., WiFi, cellular, Bluetooth, infrared) to request images from the archive system 135. The modified image 130 includes the indicia 125a-125d that users are able to visually decode to determine the identifier associated with the captured image. The modified image 130 is also printed on a printer 155. The resulting hard copy of the modified image 130 also includes the indicia 125a-125d.

The indicia 125a-125d included within the displayed and/or printed versions of the modified image 130 provide users with information that, when visually decoded, conveys one or more identifier that is associated with the captured image. Processes for visually decoding watermarked images are discussed in the descriptions of FIGS. 2 and 6.

In some embodiments, the indicia are associated with the image when it is copied or exported to convey information about the copy or export process. For example, when a user exports images from the computer 140, the computer 140 modifies the exported images by adding indicia that carry information such as the identity of the user who exported the images, the identity of the workstation used to export the images, and the date and time when the images were exported. Once the indicia are placed in the images and are recoverable, the indicia are available to help narrow a search for, and significantly improve the chances of, identifying the exporter of the video. By including identifying information as indicia within the images themselves, the identifiers are able to survive electronic copying and transformation. For example, a video exported from the system 100 and uploaded to an Internet video sharing site generally goes through a conversion process (e.g., file conversion, compression, scaling) that in most cases, will remove electronic watermarks. Visible indicia, however, remain available within the video, thus providing viewers with information that identifies who, when, or where the video was exported.

Figure 2:
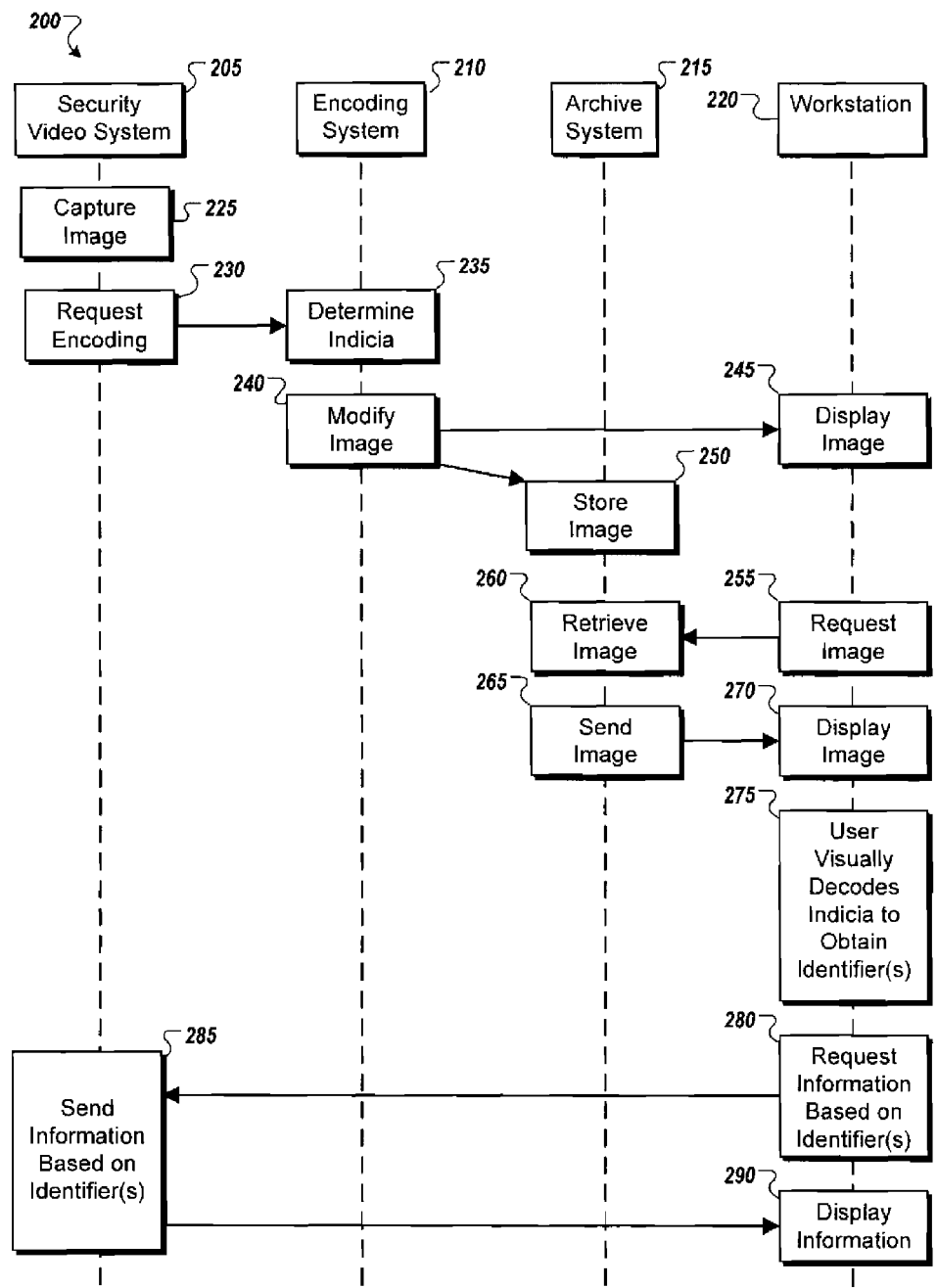
FIG. 2 is a flowchart of a representative process for adding and decoding user identifiable watermarks to captured images.

FIG. 2 is a flowchart of a representative process 200 for adding and decoding user identifiable watermarks to captured images. In some embodiments, the process 200 is optionally used by the system 100 of FIG. 1. In the process 200, a video security system 205 captures 225 an image. The image is optionally captured by digitizing video from analog camera, or by receiving digital data directly from a camera, for example via TCP/IP, USB, FireWire, and HDMI.

The security video system 205 requests 230 encoding of the captured 225 image. The request 230 is transmitted to an encoding system 210, and the encoding system 210 dynamically determines 235 one or more indicia to add to the image. For example, the encoding system 210 determines 235 the indicia on-the-fly, thereby providing the encoding system 210 the ability to watermark the captured 225 images with varying types of information such as timestamps, logged-in or other personal identities, store numbers, workstation identities, mobile camera location and/or orientation data, or environmental data (e.g., temperature readings). The determination 235 is made based on identifying information that is associated with the image. For example, the image is optionally associated with a camera ID, a location ID, a date time stamp, an operator ID, or other information that is associated with the image. For example, a two digit identifier, such as "72", is encoded as two indicia wherein the first indicium symbolizes the number "7" and the second symbolizes the number "2". In another embodiment, the time "11:54 pm" (e.g., 23:54 in 24-hour format) is encoded as four indicia representing the numbers "2", "3", "5", and "4". In various embodiments, the identifying information is represented using one, two, three, four, or more indicia. Some embodiments of indicia that are optionally used to represent identifying information are discussed in the descriptions of FIGS. 3, and 4A-4C.

The identifying information is obtained by identifying the security video system 205, or by receiving identifying information from the security video system 205, a user, or other source of data. Once the information is obtained, and the encoding system 210 determines 235 the indicia that are to be used to represent the identifying information, the image is modified 240 such that the determined 235 indicia will be visible when the image is displayed or printed. The modified 240 image is then optionally displayed 245 on a workstation where a user is able to view the image and the embedded indicia.

The modified 240 image is transmitted to an archive system 215. The image is received and stored 250 by the archive system 215. In various embodiments, the archive system 215 stores images and other data using one or more hard disks (e.g., a RAID array), a storage area network (SAN), tapes, optical drives, or other data storage media.

Once the image has been stored 250, it is available for retrieval by a display device such as the workstation 220. The workstation 220 requests 255 the image, and the archive system 215 responds by retrieving 260 the image and sending 265 it to the workstation 220. Once the workstation 220 has received the image, the image is displayed 270 to the user. The user then visually decodes 275 the indicia included within the image to obtain the one or more identifiers represented by the indicia.

In some implementations, the user is able to understand the visually decoded 275 indicia directly. For example, "HH:MM" formatted time stamps are one embodiment of information that a user is able to understand without obtaining additional information beyond what is provided by the indicia. In other implementations, the user will access additional resources to understand the visually decoded 275 identifiers. The user causes the workstation 220 to request 280 information based on the visually decoded 275 identifiers. The request 280 is transmitted to the video security system 205, which responds by sending 285 information based on the identifiers. For example, the identifier is optionally a serial number that carries no readily obvious meaning, and the security video system 205 uses the identifier as a key to retrieve additional information, such as camera location or other information associated with the image, from a security information database. The information is received by the workstation 220 which displays 290 the information to the user.

Figure 3:
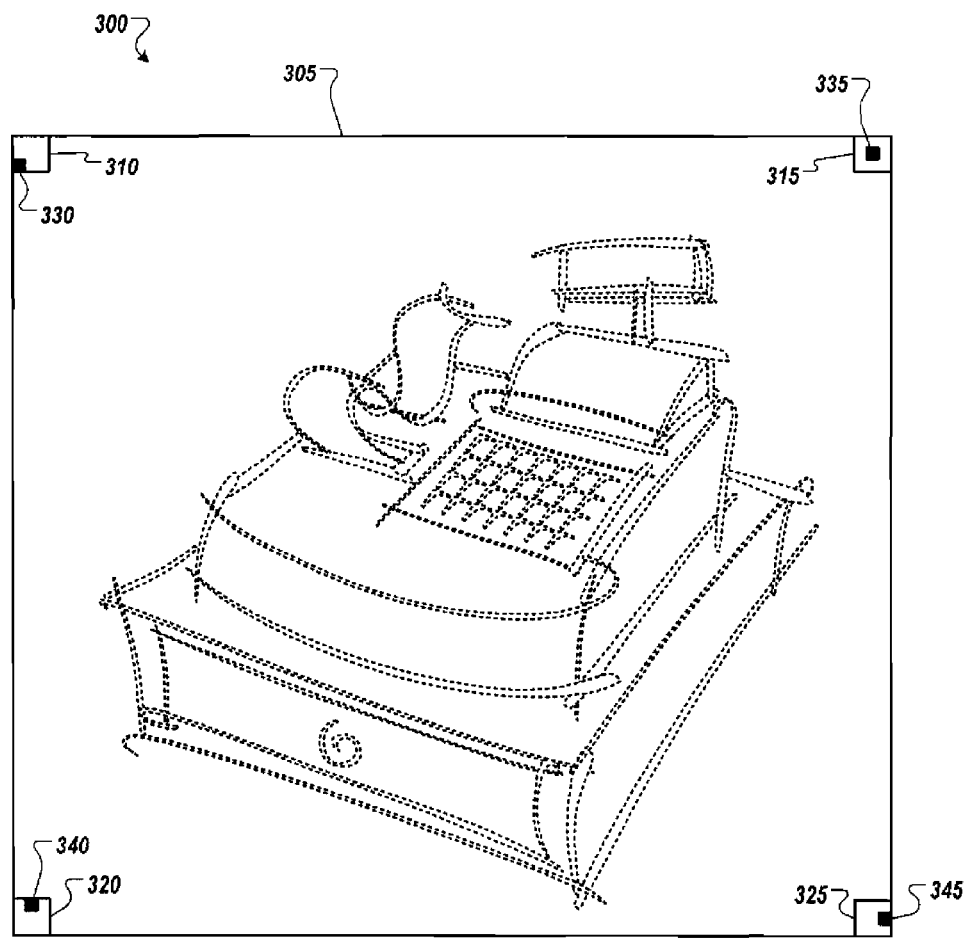
FIG. 3 is an example screen shot of an image that includes user identifiable watermarks.

FIG. 3 is an example screen shot 300 of an image that includes user identifiable watermarks. In some embodiments, the screen shot 300 is optionally the modified image 130 of FIG. 1. The screen shot 300 includes an image 305 of a scene (e.g., the image captured by a camera or the security video system 105) as well as a collection of user identifiable watermarks 310, 315, 320, and 325 located in the four corners of the image 305. The user identifiable watermarks 310-325 are black and white indicators wherein each indicator represents a value that the user is able to visually decode into a letter, digit, symbol, or punctuation mark. For example, each of the user identifiable watermarks 310-325 is a white, substantially square area, and each of the user identifiable watermarks 310-325 includes a black indicium 330-345. The collection of black indicia 330-345 occupy substantially square subregions that cover approximately one-ninth of the interior of each the of the user identifiable watermarks 310-325 that encodes a datum. In the illustrated embodiment, this geometry provides nine unique locations (e.g., a tic-tac-toe pattern) in which the black indicia 330-345 are able to be located, and thereby provides nine unique patterns that a user is able to visually decode to a collection of nine unique values. A tenth value is represented by the user identifiable watermarks 310-325 having no black indicium such as the black indicium 330-345. Patterns that are optionally used for the user identifiable watermarks 310-325 will be discussed further in the descriptions of FIGS. 4A-4C.

In some embodiments, the user identifiable watermarks 310-325 are optionally placed at arbitrary locations within the image 305. For example, the image 305 is analyzed to determine a location where the user identifiable watermark 310 is to be dynamically placed such that it will substantially avoid obscuring objects of interest within the image 305 (e.g., placing the watermark over part of a wall or the sky rather than obscuring a person's face or a license plate). A user knowledgeable about the location placement order (e.g., sequence) of the user identifiable watermarks 310-325 is able to visually decode and sequence the values represented by the user identifiable watermarks 310-325 to recover information encoded therein, such as identifying information.

In some embodiments, the user identifiable watermarks 310-325 each occupy less than about 25% of the area within the image 305. In some embodiments, the area occupied by each of the user identifiable watermarks 310-325 is less than about 10% of the area within the image 305. In some embodiments, the area occupied by each of the user identifiable watermarks 310-325 is less than or equal to about 1%, 0.5%, 0.25%, 0.1%, 0.01%, 0.001% or 0.0001% of the area within the image 305. For example, an image consisting of 6000×3000 pixels includes user identifiable watermarks that are approximately 60×30 pixels (e.g., 0.0001% of the image size), and each indicia location is 20×10 pixels (e.g., one ninth of the watermark size).

FIG. 4A illustrates an example matrix watermark template 400 used to form user identifiable watermarks. In some embodiments, the watermark template 400 optionally is one of the user identifiable watermarks 310-325 of FIG. 3. The watermark template 400 includes a collection of nine indicia locations 405a-405i in a 3×3 pattern of substantially square subregions defined by a collection of boundaries 410. Each of the indicia locations 405a-405i is able to be colored black to make one selected indicia location visibly different from the other indicia locations 405a-405i. For example, the indicium location 405f is colored black whereas the other indicia locations 405a-405e and 405g-405i are colored white. By selectively making one of the indicia locations 405a-405i visibly different from the others, the watermark template 400 is able to display nine different patterns that represent numerical values of one through nine. For example, the indicium location 405f represents the number six, so by making the indicium location 405f appear black and coloring the other indicia locations 405a-405e and 405g-405i white, the watermark template 400 conveys a value of "6". The value of zero is represented by the use of none of the indicia locations 405a-405i (e.g., all white).

In some embodiments, the boundaries 410 are optionally visible to the user. For example, by providing a visible arrangement of the boundaries 410, the user is able to readily identify the location of the visibly different indicium location 405f and visually decode the value it represents. In other embodiments, the boundaries 410 are not visible to the user. For example, the size, shape, and location of the visibly different indicium location 405f relative to a landmark within the underlying image (e.g., a corner of the image) provides inherent cues as to the position of the indicium location 405*f* within the watermark template 400.

In some embodiments, the watermark template 400 occupies a number of pixels between approximately the number of the indicia locations 405*a*-405*i* and approximately one quarter of the number of pixels within the underlying image. For example, in a 300×200 image, the watermark template 400 occupies between approximately nine pixels (e.g., one pixel for each of the indicia locations 405*a*-405*i*) and 15000 pixels (e.g., one fourth of the image area, or 150×100 pixels). In some embodiments, the watermark template 400 occupies a number of pixels between approximately the number of the indicia locations 405*a*-405*i* and approximately one tenth of the pixels within the underlying image. In some embodiments, each of indicium locations 405*a*-405*i* occupies approximately one pixel. In such an example, the watermark template 400 occupies approximately nine pixels (e.g., a 3×3 pixel area with one pixel per indicium location). In some embodiments, the indicia locations 405*a*-405*i* occupy between one pixel and a number of pixels approximately equal to the number of pixels in the underlying image, divided by the number of watermark templates 400 included in the image, and divided again by the number of indicia locations 405*a*-405*i* within the watermark template 400. For example, an image made up of 2048×1536 pixels (e.g., approximately 3.1 megapixels) is able to host four of the watermark templates 400 wherein the indicium locations 405*a*-405*i* have sizes anywhere between about one pixel each to about 87 k pixels each (e.g., 3145728 total pixels/4 quadrants/9 indicia locations per quadrant=approximately 87381.333 pixels per indicia location). In some embodiments, each of the indicia locations 405*a*-405*i* occupy between approximately one pixel and approximately 10000 pixels. In some embodiments, each of the indicia locations 405*a*-405*i* occupy between approximately one pixel and approximately 1000 pixels. In some embodiments, each of the indicia locations 405*a*-405*i* occupy between approximately one pixel and approximately 10 pixels. In some embodiments, the indicia locations 405*a*-405*i* occupy approximately one pixel each.

In some embodiments, the indicia locations 405*a*-405*i* are made visibly different by optionally colorizing the locations, altering their opacity, altering areas of the base image that underlie the locations, or by otherwise altering the indicia locations 405*a*-405*i* to make them appear visibly distinct from each other and/or the underlying image. For example, a value of "5" is represented by coloring the indicia location 405*e* white while coloring the indicia locations 405*a*-405*d* and 405*f*-405*i* black. In another example, the value of "1" is represented by turning the indicia location 405*a* substantially opaque while the indicia locations 405*b*-405*i* are made substantially transparent. In other examples, combinations of other colors (e.g., red, green, blue, yellow, brown, gray) and opacities are used.

Although the watermark template 400 is described as having nine indicium locations 405*a*-405*i*, other embodiments are contemplated. In various examples, the watermark template 400 includes three, four, five, six, eight, ten, or more locations in order to represent like numbers of possible values. For example, a watermark template having sixteen indicium locations is able to represent up to seventeen different values when using one visibly different indicium at a time (e.g., sixteen different values plus "zero").

FIG. 4B illustrates another example matrix watermark template 430 that is optionally used to form user identifiable watermarks. The template 430 is a collection of substantially circular indicia locations 435*a*-435*f* arranged in a pattern of three rows and two columns. Each of the indicia locations 435*a*-435*f* represents a value of one through six, and the value of zero is represented by the use of none of the indicia locations 435*a*-435*f*. The indicium location 435*e*, for example, is made visibly different from the other indicia locations 435*a*-435*d* and 435*f* to cause the watermark to represent the value of "5". In some embodiments, the indicia locations 435*a*-435*f* are optionally made visible (e.g., the indicium location 435*e*) using color (e.g., black, white, red, green, blue, yellow), by altering the opacity of the indicia locations 435*a*-435*f*, by altering the brightness of the indicia locations 435*a*-435*f*, or by otherwise distorting portions of the image that underlie the indicia locations 435*a*-435*f* (e.g., blurring, tinting).

In some embodiments, the visibly different indicium location 435*e* is optionally made distinguishable from the indicia locations 435*a*-435*f* by visible contrast. For example, the visibly different indicium location 435*e* is optionally colored black while the indicia locations 435*a*-435*f* are colored white.

In some embodiments, the indicia locations 435*a*-435*f* are optionally visible to a user. For example, the indicia locations 435*a*-435*f* are optionally highlighted by visible lines (e.g., rings), and the visibly different indicium location 435*e* is shown with a solid color (e.g., a disk).

In some embodiments, more than one of the indicia locations 435*a*-435*f* are optionally used in combination to expand the number of possible values that the watermark template 430 is able to represent. For example, a monochrome (e.g., two color) palette in a pattern of six locations provides $2^6$ possible unique values. A collection of visible codes are optionally used to convey a larger array of values within watermark templates such as the watermark template 430.

In some embodiments, the indicia locations 435*a*-435*f* are made visibly different by optionally colorizing the locations, altering their opacity, by altering areas of the base image that underlie the locations, or by otherwise altering the indicia locations 435*a*-435*f* to make them appear visibly distinct from each other and the underlying image. In some embodiments, by expanding the number of unique ways the indicia locations 435*a*-435*f* are able to appear to the user, the number of possible values represented by the indicium is also expanded. In one embodiment, each of the indicia locations 435*a*-435*f* (e.g., six locations) is capable of displaying four colors, thereby giving the indicia $4^6$, or 4096 possible unique visual representations which are able to convey 4096 different values.

FIG. 4C illustrates an alternative geometry of a watermark template 460 to form user identifiable watermarks. The watermark template 460 is a substantially circular area divided into a collection of wedge shaped indicia locations 465*a*-465*h*. Each of the wedge shaped indicia locations 465*a*-465*h* represents a character value "A" through "H". Each of the wedge shaped indicia locations 465*a*-465*h* occupies a visually distinguishable location within the watermark template 460, thereby providing the user with a visual cue as to their locations within the watermark template 460 and therefore the values they represent. For example, the wedge shaped indicium location 465*a* is visibly different from the other wedge shaped indicia locations 465*b*-465*h*. The user is able to visually identify which location the indicium location 465*a* occupies within the watermark template 400 and therefore visually decodes the watermark to represent the letter "A".

A number of embodiments of indicia templates, patterns, and techniques to make the indicia visible have been previously described, however, still other embodiments are contemplated. For example, any of the previously described indicia are optionally displayed in their negative forms (e.g., light colors and dark colors reversed) or in its inverse (e.g., a substantially opaque background with substantially transparent openings at the indicia locations). In some embodiments, multiple indicia are optionally made visibly different at the same time (e.g., a Braille code, a domino pattern, a binary code).

Multiple colors are optionally used in some embodiments to expand the number of meanings for a single watermark. For example, an N-element template of monochrome indicia is able to represent N values when differentiating one location at a time, but an optional palette of M colors expands the possible number of values to N×M. In embodiments where multiple indicia locations are used within a single template simultaneously, an N-element template of monochrome indicia are used to represent $2^N$ possible values, but an optional palette of M colors expands the number of possible values to $M^N$.

In some embodiments, the watermark templates 400, 430, and 460 have indicia locations that are optionally delineated using visual cues. For example, the template 400 of FIG. 4A optionally includes the boundaries 410 (e.g., as visible elements) or other visible cues that indicate the indicia locations. By providing visible cues, the user is able to see where the visibly different indicia location is relative to the other locations. In some embodiments, the watermark templates 400, 430, and 460 are optionally placed within an image such that the user does not need visual cues to determine where a visibly different indicium location is relative to others. For example, the watermark template 400 of FIG. 4A is optionally placed in a corner of an image. The boundary of the image inherently forms two sides of the watermark template 400, and the user knows the pattern of the boundaries 410 (e.g., not visible in this example) in advance. By viewing the size and shape of the visibly different indicium location 405f, the user is able to visually estimate the sizes and locations of the other indicia locations 405a-405e and 405g-405i to visualize the complete watermark template 400, and optionally use that visualization to determine the location of the visibly different indicium 405f within the watermark template 400.

Other patterns may be utilized to display visually decodable watermarks. For example, another optional watermark template is formed as a line of indicia locations (e.g., a 1×N array) along an edge of a captured image. In other examples, the number of indicia locations is optionally sufficient such that more complex symbols, letters, digits, and other characters are formed by making one or more indicia locations visibly different from other locations or the underlying image.

Figure 5:
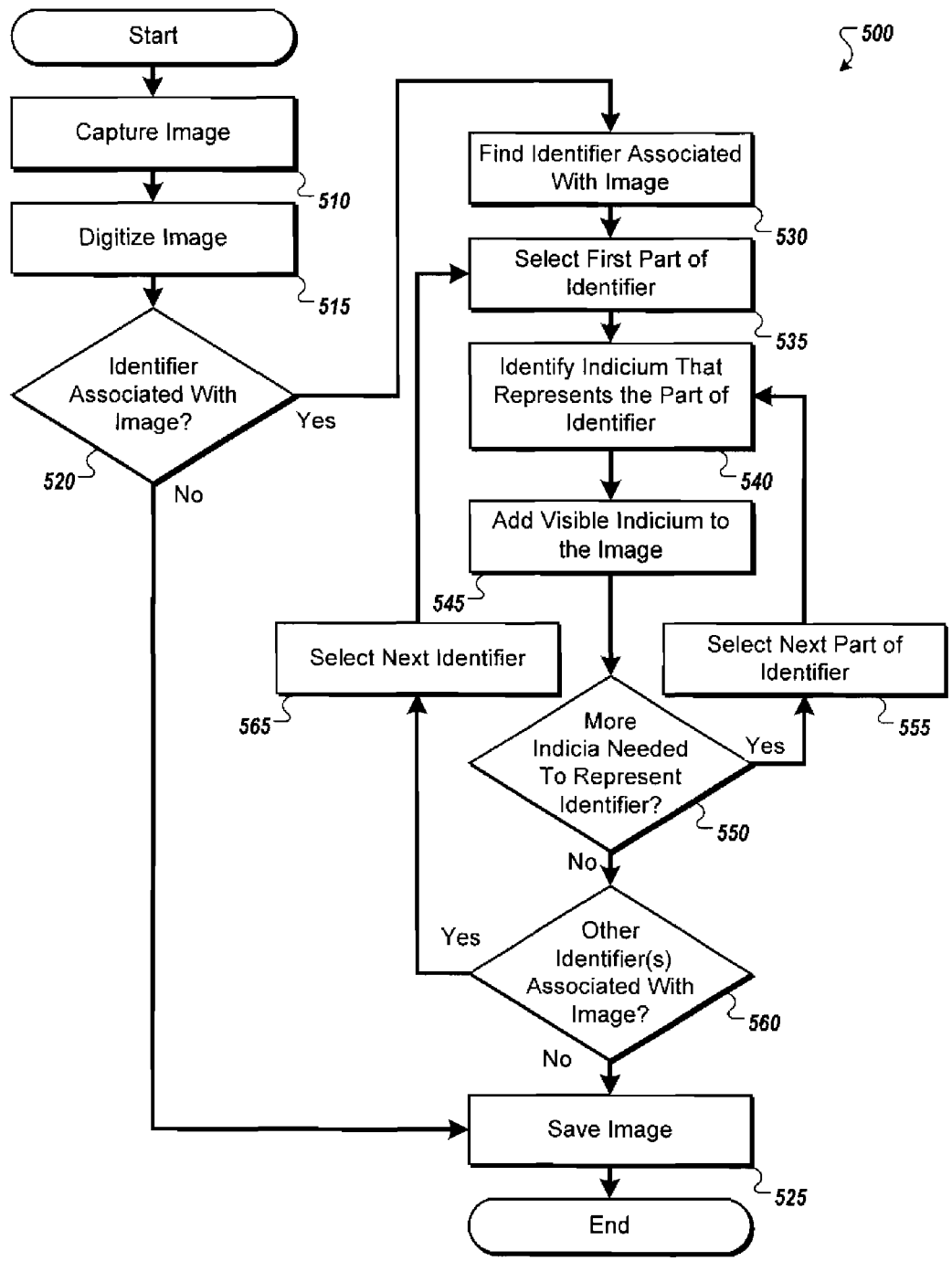
FIG. 5 is a flowchart of a representative process for adding user identifiable watermarks to an image.

FIG. 5 is a flowchart of a representative process 500 for dynamically adding user identifiable watermarks to an image. The process 500 is optionally carried out by one or more elements of an image watermarking system, such as the system 100 of FIG. 1. The process 500 begins when an image is captured 510 by a camera and digitized 515 by an encoding system (e.g., the encoding system 115).

If a determination 520 is made that no identifier is to be associated with the image, then the image is saved 525 without having watermarks or other identifying indicia added. If the determination 520 is made that one or more identifiers are to be associated with the image, then the first identifier associated with the image is found 530. The identifier is determined either statically (e.g., every image is associated with the same identifier) or dynamically (e.g., the encoding system is able to associate different identifiers with different images). For example, the identifier is optionally found 530 by receiving information from the camera (e.g., a camera identity). In another embodiment, the identifier is optionally found 530 by querying a security database to retrieve the identity of a user who was on duty when the image was captured 510. In yet another embodiment, the identifier is optionally found by consulting a lookup table that associates a video digitizer port with a camera identity, and by knowing which port the image was captured 510 on, the identity of the camera is obtainable by finding 530 the identity of the camera connected to that port.

The first part of the identifier is then selected 535. For example, an individual indicium optionally represents a single digit, character, or symbol (e.g., punctuation, hyphens, percent signs, monetary unit symbols). In such an embodiment, an identifier that includes multiple characters, digits, or symbols will be represented by multiple indicia (e.g., a three-character user ID will use three watermarks).

The indicium (e.g., watermark) that represents the selected part of the identifier is then identified 540. For example, the digits 1-9 are optionally represented by nine unique and visually decodable symbols, such as those discussed in the descriptions of FIGS. 3 and 4A-4C. One of the unique and visually decodable symbols that correspond to the selected digit is selected for inclusion in the image as a watermark. Once the indicium has been identified 540, the indicium is added 545 to the image such that the indicium will be visible when the image is displayed to a user.

If a determination is made 550 that additional indicia are needed to represent the identifier (e.g., the identifier includes multiple characters, symbols, or digits), then the next part of the identifier is selected 555, and the indicium that is to represent that part of the identifier is identified 540. If a determination is made 550 that additional indicia are needed, then a determination is made 560 as to whether other identifiers are associated with the image. For example, the image is optionally associated with multiple identifiers such as the camera identity, a user identity, a time stamp, a location code, or other information. In an embodiment of a public transit vehicle, the image is optionally associated with bus number "28" and a trip number "04", and the resulting image will include four watermarks to convey the meaning of two identifiers having two digits each. If other identifiers are associated with the image, then the next identifier is selected 565, and the first part of the next identifier is selected 535.

if a determination is made 560 that no other identifiers are associated with the image, then the image is saved 525. In some embodiments, the saved 525 image is optionally made available for viewing or download, for example, on a file server, web server, or FTP server. In some embodiments, the saved 525 image is optionally transmitted to display devices. In an embodiment of a surveillance system, motion triggers the capture 510 of an image which is modified according to the process 500, and is then optionally sent (e.g., emailed) to one or more users who can open the email in order to view the image and visually decode the included watermarks.

Figure 6:
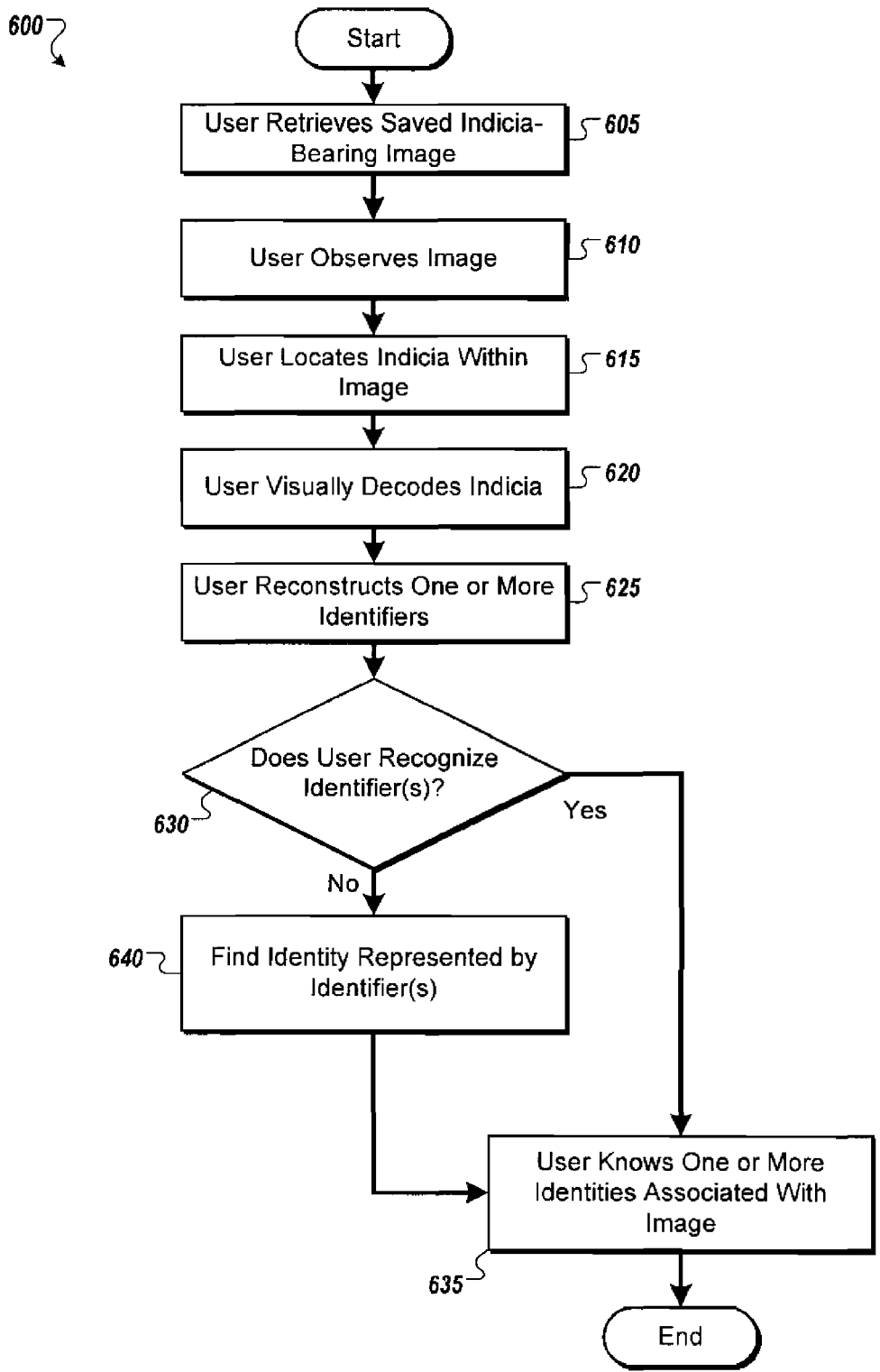
FIG. 6 is a flowchart of a representative process for decoding user identifiable watermarks.

FIG. 6 is a flowchart of a representative process 600 for decoding user identifiable watermarks. The process 600 begins when a user retrieves 605 a saved indicia-bearing image. In some implementations, the user optionally retrieves the image by opening a the image file from a local or network file location, by opening an image file attached to an email or multimedia message, by querying a web server, FTP server, database, or other image storage location.

The user then observes 610 the image, and locates 615 the indicia included within the image, wherein each indicia encodes a datum. For example, the indicia are optionally placed in substantially the same locations for each image (e.g., the corners, along one or more edges, a substantially consistent location within the image), such that the user is able to consistently locate the indicia across a number of images. The user then visually decodes 620 the indicia to recover the data encoded therein. For example, the indicia are optionally formed within frameworks or matrices, such as those discussed in the descriptions of FIGS. 4A-4C, which provide the user with explicit or inherent visual cues that enable the values represented by the indicia to be understood visually and without the need for decoding equipment such as a bar code scanner.

The user reconstructs 625 one or more identifiers from the decoded 620 indicia. For example, the image optionally includes six indicia which are able to represent a variety of permutations of identifiers (e.g., six single character identifiers, two three-character identifiers, three two-character identifiers, a two-character identifier and a four-character identifier, one six-character identifier). In addition to knowing how to interpret the indicia, the user also knows how to group the indicia in order to reconstruct 625 the identifiers.

If the user determines 630 that he or she recognizes the identifiers, then the user knows 635 the identities associated with the image. In such an embodiment, the user knows that a retail store has one surveillance camera for each of twenty aisles, and will inherently understand that a reconstructed 625 identifier of "12" means the image is that of aisle number "12". However, if the user determines 630 that he or she does not recognize the identifiers, then the user finds 640 the identity represented by the identifiers. For example, the user reconstructs 625 the identifier "6523" from indicia included within an image, but this identifier has no immediate meaning to the user. The user finds 640 the identity represented by the identifiers by optionally querying a database or by looking up the number in a printed or electronic list to obtain additional, optionally complex, information associated with the image. For example, the identifier "6523" is a serial number optionally assigned to an image, and the identifier can be used to query a database to determine that the image was taken by camera number "9" in building number "44" at 9:45 PM under the supervision of security officer John Doe). The user now knows 635 the identities associated with the image.

Figure 7:
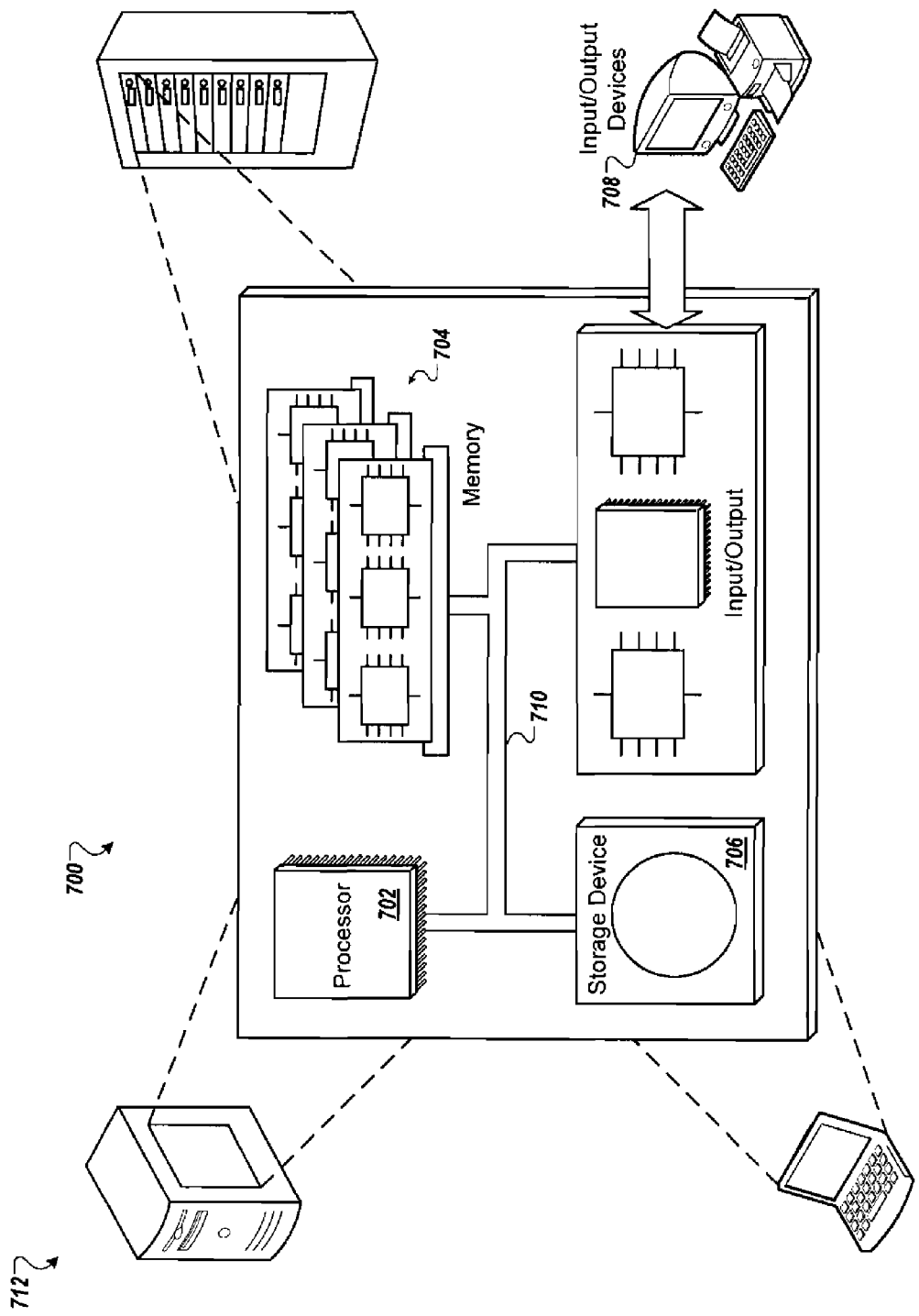
FIG. 7 is a schematic diagram of an example of a generic computer system.

FIG. 7 is a schematic diagram of an example of a generic computer system 700. The system 700 is optionally used for the operations described in association with the method 300 according to one implementation. For example, the system 700 is optionally included within either or all of the security video system 105, the encoding system 115, the archive system 135, the workstation 140, or the handheld device 145.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 is a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described are optionally implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are optionally performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is optionally deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features are optionally implemented on a computer having a display device such as a CRT (cathode ray tube) or LCD (liquid crystal display) monitor for displaying information to the user and a keyboard and a pointing device such as a mouse or a trackball by which the user is able to provide input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are optionally connected by any form or medium of digital data communication such as a communication network. Embodiments of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps are optionally provided, or steps are optionally eliminated, from the described flows, and other components are optionally added to, or removed from, the described systems. Accordingly, other implementations are within the scope of the following claims.

Although exemplary embodiments have been described with reference to the figures, other implementations are possible. For example, the system 100 is able to capture and watermark video of a retail store environment. The encoding system 115 modifies the video to include indicia that convey information such as a store number, camera number, workstation, and logged-in or other user information. Persons who view the watermarked video and who are familiar with the format and placement of the indicia are able to visually decode the indicia to determine information such as the store number, camera number, workstation, and logged-in or other user information.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A computer-implemented method for adding visually decodable watermarks to electronic images, comprising:
    capturing, at an image capture device, an image of a scene;
    converting, with a first computer, the image into an electronic image data file;
    associating the image with identifier data;
    determining, with a second computer, a plurality of indicia to represent the identifier data wherein each indicium of the plurality of indicia comprises an encoded datum that can be decoded upon visual inspection by a user;
    modifying, with the second computer, the electronic image data file to include the plurality of indicia in various locations according to a placement order such that each indicium of the plurality of indicia appears overlaid within a quadrant of the electronic image when the data file is decoded and displayed; and
    displaying, at a display device, the modified data file such that the user knowledgeable about the placement order of the plurality of indicia is able to visually decode the plurality of indicia to determine the identifier data.

2. The method of claim 1, wherein each indicium of the plurality of indicia comprises a matrix of subregions, wherein each of the subregions is individually visually distinguishable from the other subregions.

3. The method of claim 2, wherein each of the subregions is displayed with a partial opacity.

4. The method of claim 1, wherein the identifier data identifies a location associated with the image.

5. The method of claim 1, wherein each indicium of the plurality of indicia is located in a different corner of the image.

6. The method of claim 1, wherein each indicium of the plurality of indicia is dynamically overlaid onto the image.

7. The method of claim 1, wherein the identifier data identifies the image capture device.

8. The method of claim 1, wherein the first computer and the second computer are the same computer.

9. A system for adding a visually decodable watermark to an electronic image, wherein the watermark is visually decodable to convey an identity associated with the image, the system comprising:
    an image capture device positioned to capture a plurality of images of a scene, wherein each of the plurality of images is associated with image data;
    an image encoding device to convert the plurality of images into a plurality of electronic image data files, to determine a plurality of visually decodable indicia to represent the image data, and to modify the plurality of electronic image data files to overlay the plurality of visually decodable indicia such that each of the plurality of visually decodable indicia are visible in a separate quadrant of each image when the plurality of electronic image data files are decoded and displayed;
    an archive system to store the electronic image data files overlaid with the visually decodable indicia; and
    a display device to retrieve and decode the electronic image data files overlaid with the visually decodable indicia, and to display the plurality of images and the plurality of visually decodable indicia included therein to a user knowledgeable about the format and placement of the plurality of the visually decodable indicia such that the user can visually decode the plurality of visually decodable indicia to determine the image data.

10. The system of claim 9, wherein each of the plurality of visually decodable indicia comprises a plurality of subregions, wherein each of the plurality of subregions is individually capable of being made visually distinguishable from the other subregions in the plurality of subregions.

11. The system of claim 9, wherein the plurality of images comprises a video sequence.

12. The system of claim 9, wherein each of the plurality of visually decodable indicia has a partial opacity and is located at a separate corner of the plurality of images.

13. The system of claim 9, wherein each of the plurality of visually decodable indicia is dynamically located within the plurality of images.

14. The system of claim 9, wherein the visually decodable indicia are located at predetermined positions relative to boundaries of each image.

15. The system of claim 9, wherein the image data identifies the image capture device.

16. A computer-readable medium having recorded therein instructions for adding humanly decodable watermarks to digital images by causing one or more machines to perform operations comprising:
    capturing, with a camera, an image of a subject of interest;
    converting, with an image processor, the image into a digital image;
    dynamically associating the digital image with an identification code having a plurality of characters in a first sequence;

determining, with an encoding processor, a plurality of humanly decodable watermarks wherein the plurality of humanly decodable watermarks represent the plurality of characters in the first sequence;

modifying, with the encoding processor, the digital image to include the humanly decodable watermarks in each of a plurality of quadrants of the digital image in a second sequence such that the plurality of humanly decodable watermarks is visible when the digital image is displayed; and decoding and displaying, with a display computer, the digital image such that a user knowledgeable about the format and the second sequence of the humanly decodable watermarks can visually decode the humanly decodable watermarks to determine the plurality of characters and the first sequence to determine the identification code.

17. The computer-readable medium of claim 16, wherein each of the plurality of humanly decodable watermarks comprises a plurality of subregions, wherein some of the plurality of subregions are visually rendered differently than the other subregions in the plurality of subregions.

18. The computer-readable medium of claim 16, wherein the digital image is a frame of a video sequence.

19. The computer-readable medium of claim 16, wherein each of the plurality of humanly decodable watermarks is located proximate a separate corner of the digital image.

20. The computer-readable medium of claim 16, wherein each of the plurality of humanly decodable watermarks is located at a predetermined position relative to a boundary of the digital image.

21. The computer-readable medium of claim 16, wherein the identification code identifies the camera.

* * * * *